Oct. 19, 1926.
E. ROBERTS
1,604,102
APPARATUS FOR SPRAYING SUGAR AND THE LIKE
Filed April 8, 1921     4 Sheets-Sheet 1
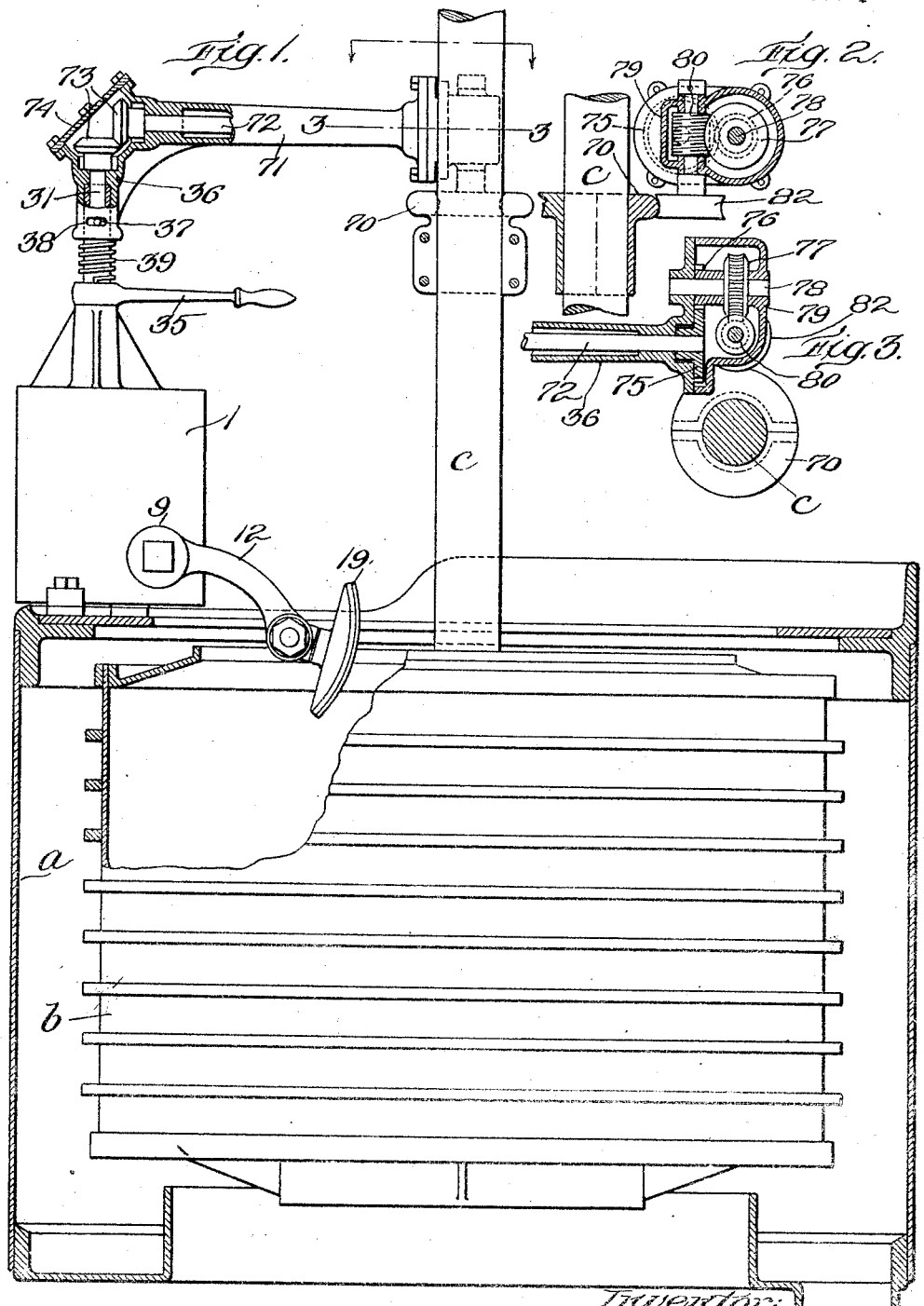

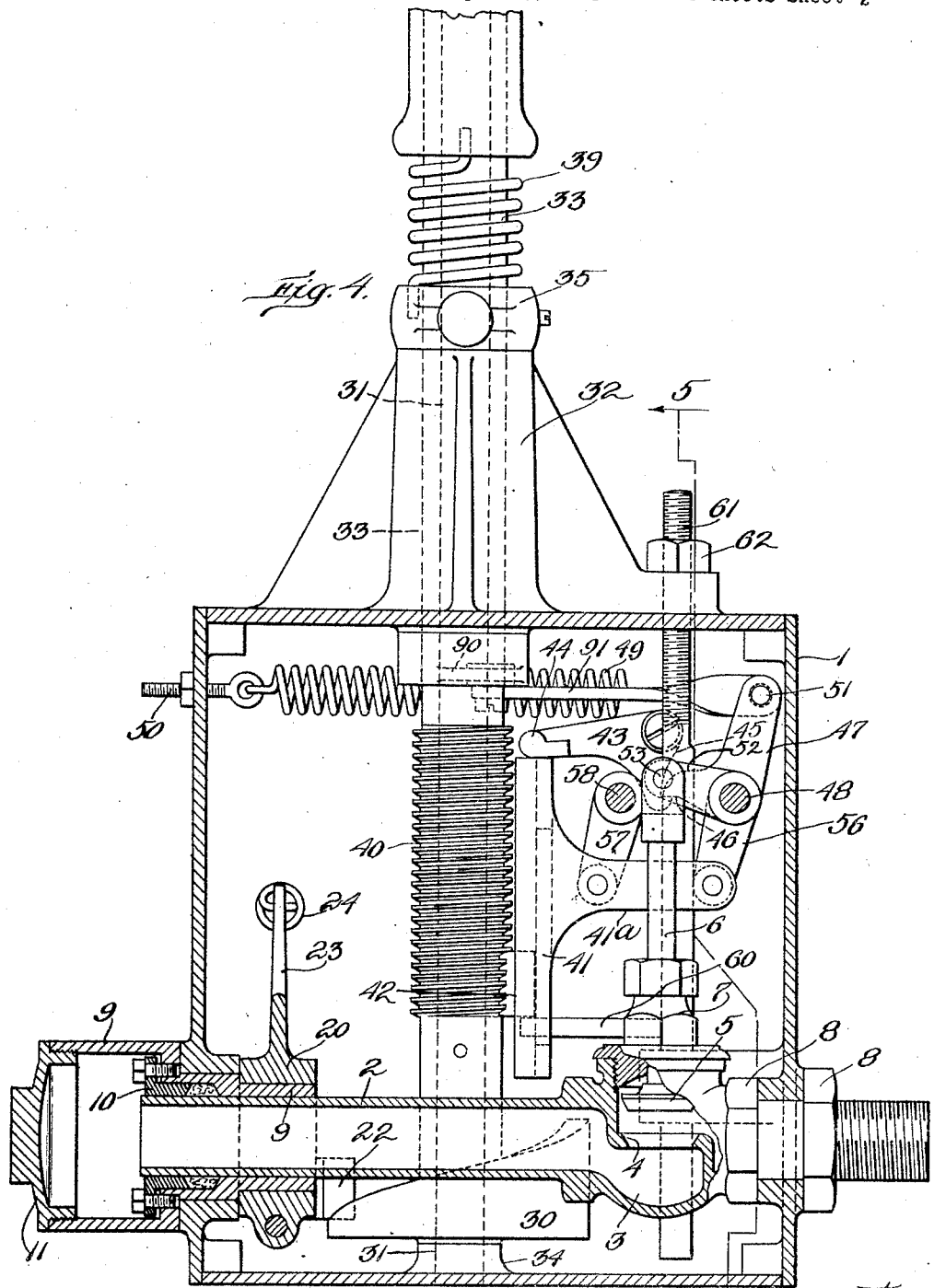

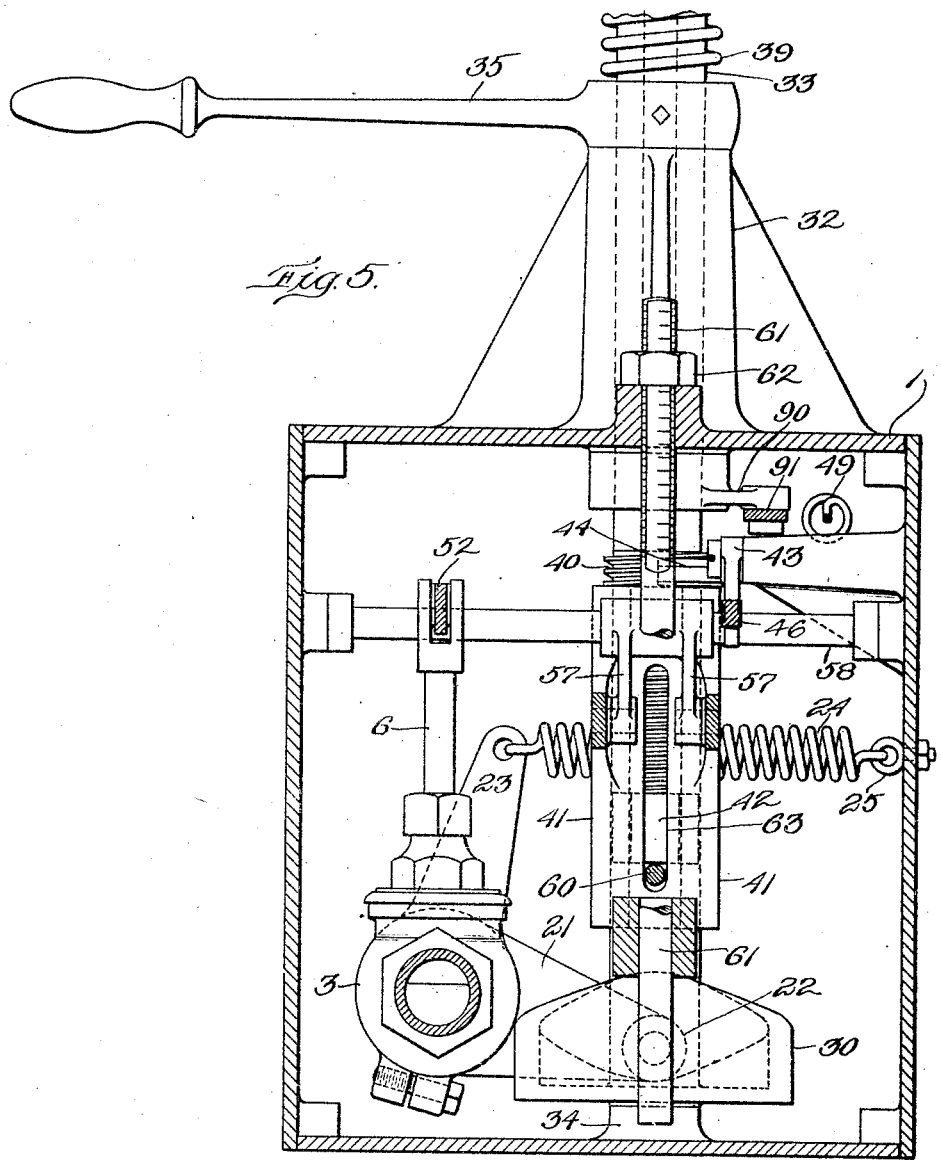

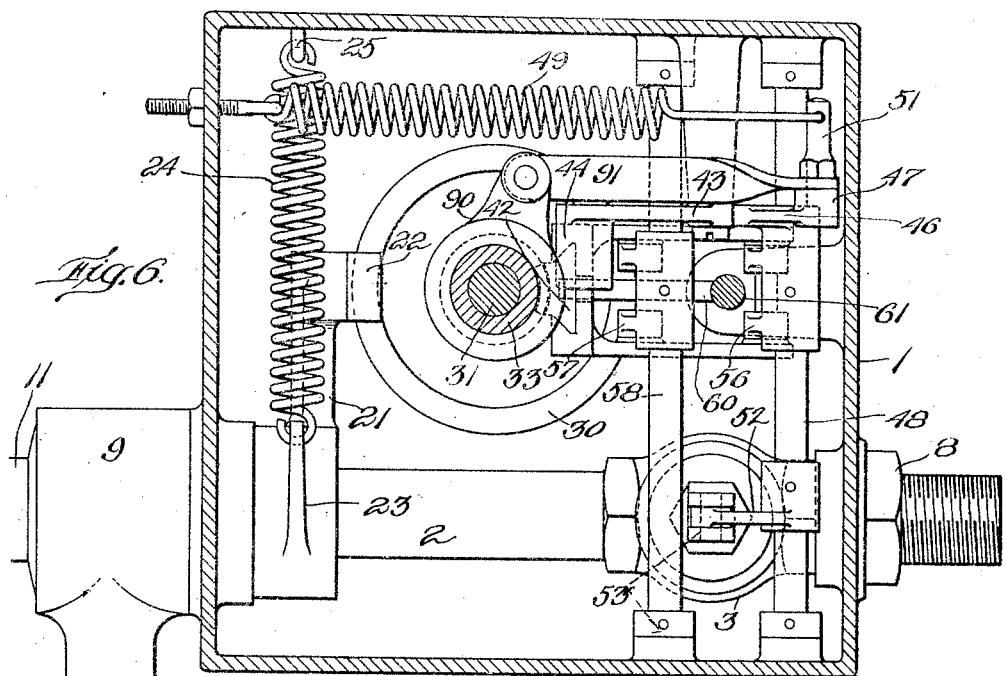

Patented Oct. 19, 1926.

1,604,102

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

APPARATUS FOR SPRAYING SUGAR AND THE LIKE.

Application filed April 8, 1921. Serial No. 459,677.

This invention relates to the problem of washing sugar or other separate solids contained in centrifugal baskets and is in the nature of an improvement upon the earlier device of this kind disclosed in U. S. patent to Roberts and Gibson No. 1,244,095 dated April 24, 1917.

The machine of the aforesaid patent was operated by a small motor running independently of the centrifugal machine itself. The present invention is intended to provide a machine of this class which shall be driven by an intermittent and automatically controlled connection with the centrifugal basket shaft or spindle which shall be so constructed and arranged as to readily accommodate itself to the gyratory or swaying movement of the rotary basket spindle.

To this end the invention comprises, in a general sense, the combination with the centrifugal basket shaft, of a timing mechanism operatively connected with the centrifugal basket shaft in conjunction with a suitable spray nozzle, a cut-off valve therefor, and means controlled by said timing mechanism for automatically closing said valve to shut off the supply of liquid from the spray nozzle and for automatically interrupting the automatic driving connection between the basket spindle and the timing mechanism whereby the timing mechanism ceases to operate when the valve is closed. This and other features of the invention will be more particularly explained in the following specification and will be defined in the claims annexed hereto.

In the accompanying drawings I have shown a simple and effective mechanism constructed in accordance with the principles of this invention as illustrative of the same in which:

Figure 1 is a side elevation showing the suspended centrifugal basket and its surrounding curb on which curb is located the automatic spray apparatus with its driving connection in operative relation to the basket spindle.

Figure 2 is a detail view of the driving connection adjacent to the centrifugal spindle, a part of the housing being shown in section.

Figure 3 is a plan view of the parts shown in Figure 2.

Figure 4 is an enlarged view in rear elevation, that is, viewed from the side toward the basket spindle, of an automatic timing mechanism and valve closing mechanism.

Figure 5 is a side elevation partly in section of the timing and valve closing mechanism viewed from the direction opposite to that showing Figure 1.

Figure 6 is a plan view partly in section showing the timing and valve closing mechanism.

Figure 7 is a detail showing in elevation the detent or latch which prevents the operation of the valve closing mechanism.

In the practice of my invention, according to the form illustrated in the drawings, I have mounted on the curb $a$ surrounding the centrifugal basket $b$ which is suspended from the gyratory rotary spindle $c$, a casing 1 which serves both as a detent and as a support for the principal working parts of the washing apparatus. As best shown in Figures 4 and 6, there is secured in the lower part of said casing a liquid supply pipe or conduit 2 provided with a valve chamber 3, having a valve seat 4 adapted to be closed by a reciprocatory valve 5 carried by the vertical valve stem 6 which slides through the stuffing box 7.

This liquid supply pipe 2 passes through opposite openings in the opposite walls of the casing 1 and is clamped in one wall by means of the clamping nuts 8 with its farther end projecting through the opposite wall and forming a bearing on which turns or oscillates a sleeve or hollow hub 9 to which is attached a packing gland ring 10 by means of screws arranged to compress snugly in suitable packing material interposed between the gland ring 10 and the opposite inside shoulder of the hub or sleeve 9. It will be seen by reference to Figure 4 that this sleeve turns upon the encircled end portion of the pipe 2, while at the same time getting an external bearing in the bearing aperture formed in the wall of the casing. At its outer end this hollow chamber or sleeve is provided with a removable cap or plug 11. At one side the sleeve 9 is provided with a downwardly inwardly projecting hollow arm 12 which terminates in a sort of hub or bearing portion 13 in which is introduced the close-fitting neck portion 14 of an elbow 15. A clamping nut 16 on the outer end of the neck 14 serves to seat this neck portion of the elbow securely in the hub 13 of the hollow arm, a washer 17 being interposed to prevent leakage. The neck is provided with a series of peripheral ports 18 to allow water to flow from the hollow arm into the interior of the elbow. At its inner and lowermost end there is connected to the elbow a spray nozzle 19 of any suitable form, such for example, as shown in the aforesaid patent. This construction permits the setting or adjustment of the spray nozzle at any desired angle to properly direct the spray against the walled-up solid on the interior of the centrifugal basket.

About the inner reduced portion of the sleeve 9 is clamped a bell crank lever 20 whose hub is split to permit its being tightly secured upon the sleeve. The lower arm 21 of this bell crank lever carries an anti-friction roller 22 which is normally pressed against the upper edge of a wave cam 30 secured to the vertical shaft 31 which constitutes the main operating shaft of the spraying apparatus. The other arm 23 of the bell crank lever is engaged by a tension spring 24 whose opposite end is hooked into a lug or suitable anchorage 25 carried by the inside front wall of the casing 1.

On the top of the casing 1 is provided a housing 32 having a vertical central bore forming a bearing for an oscillatory sleeve 33 which is internally bored to receive the upper end of the main operating or actuating shaft 31, thus affording an upper bearing for said shaft. The lower end of said shaft is mounted in a foot-step bearing 34 on the bottom of the casing. Tightly secured to said sleeve 33 in a hand lever 35 whereby the sleeve may be turned about its axis for a purpose to be later described. On the upper end of said sleeve, as shown in Figure 1, is mounted a hollow angle arm housing 36 which projects down outside the upper end of the sleeve 33 and is keyed to it by means of a pin 37 on the sleeve 33 which projects through a horizontal slot 38 in the member 36 to permit a partial rotative movement of the housing 36, while affording stops to limit such rotative movement. A helical torsion spring 39 has its lower end anchored to the hub of the lever 35, while its upper end is anchored to the lower part of the housing member 36. The thrust or torque of this spring tends to turn the housing in a clockwise direction as viewed from overhead.

It will therefore be seen that the vertical actuating shaft 31 may be given a continuous rotation when it is desired to have the spraying apparatus in operation while the surrounding sleeve has a limited rotative movement for the purpose of opening the cut-off valve as well as for the purpose of setting the automatic timing mechanism in operation, as will be explained.

The timing mechanism, according to the form herein shown, comprises a worm or hollow screw member 40 which is secured to the lower end of the shaft 31 so as to constitute, in effect, an integral portion thereof. Adjacent to this worm or screw shaft section is mounted a vertical bracket 41 which extends in parallelism to the axis of the shaft and has dovetail ways to receive a traveling screw threaded block or nut 42 as shown in Figures 4 and 6, which traveling member acts as a release member for tripping a dog or latch 43 in the form of an angle arm or bell crank lever having an inwardly projecting arm 44 overhanging the path of travel of the release member 42, and which also has a downwardly extending arm 45 provided with a hook to engage a projecting finger 46 extending forwardly from the lever 47 that is fast on the horizontal rock shaft 48 in order to prevent said rock shaft from rotating in a contraclockwise direction under the tension of the contractile spring 49 which is anchored to the bolt 50 at one end and to a pin 51 carried by a lever 47 at the other end.

The tension of the spring tends to pull the rock arm 47 forward toward the middle of the casing which movement, however, is resisted by the hook arm of the latch 43 engaging the projecting finger 46 of the lever 47 so long as such engagement continues. As the bunt end of the arm 44 overhangs the path of the travel of the release block or member 42, it will be seen that when the block 42 is in engagement with the worm or screw 40 the rotation of such worm will cause the block 52 to travel upwardly until it presses against said arm 44 swinging it about its axis in a clockwise direction and thereby causing it to release its engagement with the finger 46 of the rock shaft. As soon as such automatic release takes place, the spring 49 is free to turn the rock arm or rock shaft toward the middle of the casing. The rock shaft has another arm 52 provided with a fork or slotted end engaging a pin 53 projecting laterally from the valve stem 6 so that such rotative movement of the rock shaft 48, under the tension of the spring 49 forces the valve stem downwardly causing the valve 5 to seat firmly against its valve seat 4 in the valve chamber thus shutting off completely the supply of liquid to the spray nozzle.

At the same time this rotation of the rock shaft causes the slide block bracket 41 to be retracted away from the worm so as to disengage the release member 42 from operative engagement therewith. This is accomplished by providing two parallel suspension links 56, 57 whose lower ends are pivotally connected with the roller extension 41ª of the release block carrier or bracket. The link 57 is mounted on a horizontal shaft 58, while the link 56 is secured to the rock shaft 48 so as to oscillate therewith. It will therefore be seen that a rotative movement of the rock shaft under the influence of the tension spring 49 will operate to swing the parallel links 56, 57 outwardly away from the actuating shaft to cause disengagement of the release block therefrom. When so disengaged the release member is free to drop by gravity in its guide-way in the bracket until it rests against the adjustable stop pin 60 which is carried by a vertical slide rod 61 whose upper end is screw threaded and carries an adjusting nut 62. The pin 60 passes through a vertical central slot 63 formed in the carrier bracket 41 which slot permits the pin to project through into position to be extended beneath the block 42, and also prevents the rotative movement of the rod 61 when the nut 62 is turned for adjusting the vertical position of the rod in order to position the stop finger 60 at the desired level for the purpose of increasing or diminishing the length of travel of the release block, and thereby increasing or diminishing the gyration of operation of the timing shaft before the latch 43 is automatically knocked off to cut off the liquid supply.

As previously explained it is the intention to drive the actuating shaft of this apparatus from the centrifugal basket spindle by a connecting drive mechanism which shall be operative only when the spraying of the sugar is desired, that is, when the valve is open, and shall become inoperative or interrupted when the cut-off valve is closed. It is also intended to provide a construction of this kind which shall follow or accommodate itself to the gyratory swinging of the basket spindle. I will now describe the driving mechanism by which the actuating shaft 31 is intermittently driven from the basket spindle.

On the basket spindle c at the proper elevation is clamped or otherwise secured a sectional pulley member 70 having a convex periphery. The housing 36 has a horizontally extended arm 71 in which is mounted a horizontal transmission shaft 72 having bevel gear connection with the upper end of the shaft 31 as shown in Figure 1, the chamber containing the bevel gears being closed by a removable cover 74. To the inner end of said driving shaft 72 is secured a spur gear 75 intermeshing with a smaller pinion 76 which is combined with a worm gear 77 mounted on the bearing arbor or shaft 78 carried by a hollow housing 79. A short vertical worm shaft 80 is mounted in upper and lower bearings in this housing 79 so as to mesh with the worm gear 77, and said worm shaft 80 carries at its lower end a concave friction pulley 82 arranged in the same horizontal plane with the convex periphery of the pulley 70, so that when the inner end of the arm 71 of the housing is swung toward the basket shaft these two pulleys will mutually engage to establish a frictional driving connection between the driving shaft 72 and the basket spindle lever.

The torsion spring 39 engaging respectively the vertical member of the housing and the hub of the hand lever 35 which is fast on the sleeve 33, acts to press the pulley 82 into driving contact with the pulley so as to maintain constant driving connection unaffected by the gyration of the basket spindle so long as the inner end of the arm 71 is maintained in juxta-position to the basket shaft.

The lower end of the vertical sleeve 33 inside the casing is provided with a projecting arm 90 which is connected with the pin 51 carried by the rock arm or lever 47 by means of a pivotal link 91, so that the rock shaft 48, which forms part of the timing or controlling mechanism, is interconnected with the sleeve 33 and the controlling lever 35. Hence as the rock shaft 48, when released from the latch or detent 43, rocks inward toward the actuating shaft 31 under the tension of spring 49, the sleeve 33 will be turned in a contraclockwise direction and this turning movement will be transmitted through the pin and slot connection 37, 38 to the housing 36 thereby carrying the inner end of the arm 71 away from proximity to the basket spindle and wholly disengaging or interrupting the driving connection established between the two friction pulleys 70 and 82. As already explained, this inward rotation of the rock arm 47 and of the rock shaft 48, under the influence of spring 49, operates to close the cut off valve 5 to shut off the liquid supply.

The entire operation is as follows:

Assuming the valve to be closed and the arm 71 swung away from the basket spindle; in this position the spray apparatus will be at rest and no action takes place. When it is desired to wash the sugar the operator throws the controlling lever 35 in a clockwise direction which results in swinging the arm 71 toward the basket shaft to establish driving connection between the friction pulleys 70 and 82. This same movement of the control lever and sleeve 33 acts, through the link 91 (Figure 6) to turn the rock shaft 48 about its axis in a clockwise direction, the rock shaft acting, through its described connections, to shift the carrier bracket 41 toward the worm 40 so that the release block 42 is intermeshed therewith. At the same time the valve stem is raised and opens the valve. By this single shifting movement of the lever, therefore, the liquid supply is admitted to the spray nozzle, a driving connection is established between the actuating shaft and the basket spindle and the timing mechanism is started on its operation while the spray nozzle is oscillated by means of the cam 30 and the arm 21. The valve remains open, the oscillation of the spray nozzle continues, and the release block or traveler continues to rise along its driving worm until said block engages the latch 44 and releases its detent engagement with the rock shaft arm. As soon as this release is effected, the contractile spring 49 acts to simultaneously close the valve, disengage the traveling block 42 from its driving worm and interrupt the driving connection between the basket spindle and the actuating shaft so that the apparatus is once more at rest with the liquid supply cut off and so continues until the control lever is again thrown to operating position. Obviously, the length of the washing period will depend upon the distance that the timing block or release member 42 has to travel along the worm, and this is determined by the adjustment of the stop pin 60.

In consequence of the above arrangement no part of the washing apparatus is in action until the valve is opened, and all parts of the washing apparatus are arrested in their movement at the same time the valve is closed.

What I claim is:

1. In an apparatus for spraying the contents of a centrifugal basket, the combination of a supporting casing, a vertical actuating shaft mounted therein, timing mechanism operatively connected with the lower portion of said actuating shaft and acting, after a predetermined interval, to cause the cut-off of the liquid spray, a horizontal driving shaft forming an intermediate connection between said actuating shaft and the basket spindle of the centrifugal through the medium of friction pulleys, and means for automatically swinging said horizontal shaft away from its driving connection with the basket spindle, said means being controlled by the timing mechanism to operate when the spray is cut off, substantially as described.

2. In an apparatus for spraying the contents of a centrifugal basket, the combination of a spray nozzle, a cut-off valve for controlling the flow of liquid to said nozzle, automatic timing mechanism operating to cause said valve to close after a predetermined period, a main actuating shaft for operating the timing mechanism, a housing pivotally mounted by said actuating shaft, a connecting driving shaft in said housing for establishing driving connection with the basket spindle of the centrifugal, and means for normally maintaining said driving connection in operative relation to the basket spindle so as to accommodate the swinging movement of said spindle so long as the cut-off valve remains open, substantially as described.

3. In an apparatus for spraying the contents of a centrifugal basket, the combination of a spray nozzle, a cut-off valve for controlling the supply of liquids thereto, automatic timing mechanism, a main actuating shaft for driving said timing mechanism, a pivoted housing mounted coaxially with said shaft, a rotatable controlling lever having operative connection with said pivoted housing and with said cut-off valve, a horizontal driving shaft mounted in said housing to establish a driving connection between the basket spindle and the actuating shaft when the valve is open, and to be moved out of operative relation to said basket spindle as the valve is closed, substantially as described.

4. In an apparatus for spraying the contents of a centrifugal basket, the combination of an oscillatory spray nozzle, a cut-off valve for controlling the flow of liquid to said nozzle, means for oscillating said spray nozzle, automatically controlled means for closing said valve after the lapse of a predetermined period from its opening, an actuating shaft for actuating said controlling means for oscillating said spray nozzle, a rotatable lever having operative connection with said valve and with said controlling means, a connecting train for establishing driving connection between the basket spindle and said actuating shaft, said connecting train being movable toward and away from said basket shaft by means of said lever, said lever having a spring tension connection by which said connecting train is normally pressed into operative connection with the basket spindle when the cut-off valve is open, substantially as described.

5. In an apparatus for spraying the contents of a centrifugal basket, the combination of a spray nozzle and its controlling cut-off valve, controlling means by which said valve is automatically closed after a predetermined period, an actuating shaft therefor, a pivotal housing mounted to swing coaxially of said shaft, a horizontal shaft mounted in said housing and having driving connection with the basket spindle through the medium of a worm gear drive and friction pulleys, and means for shifting said housing to interrupt the driving connection of the basket shaft and at the same time close the cut-off valve, substantially as described.

6. In an apparatus for spraying the contents of a centrifugal machine basket, the combination of a spray nozzle, a valve controlling the flow of liquid thereto, a vertical actuating shaft, a rotatable sleeve surrounding the lower end of said shaft, a pivotal housing mounted around the upper end of said shaft and having a pin and slot connection with said sleeve, driving connecting means carried by said housing in position to be moved into operative connection with the centrifugal basket shaft, a torsion spring connecting said sleeve and said housing, and a controlling member moved by said actuating shaft and acting to automatically cause the closing of the valve and the moving of the housing away from the basket shaft, substantially as described.

7. In an automatic sprayer for centrifugals, the combination with a spraying nozzle and its cut off valve, of a vertical actuating shaft, a timer arranged to be operatively connected with said actuating shaft by means of a manually controlled starting member having connection with said valve to open it, a transmission shaft forming a driving connection between the shaft of the centrifugal and said actuating shaft, said driving connection being effected by said manually controlled member and being interrupted through the action of said timer, the latter acting also to cause the closing of the cut off valve after a predetermined period.

8. In an automatically controlled sprayer for centrifugals, the combination with a spraying nozzle and its cut-off valve, of an upwardly extending driving shaft having automatically discontinuable driving connection with the rotary centrifugal, a timer mechanism driven by said shaft and acting to automatically effect the closing of the cut-off valve after a predetermined period and acting, at the same time, to effect an interruption of the driving connection between the centrifugal and said driving shaft whereby the sprayer and its driving shaft cease to operate while the centrifugal is still running, substantially as described.

9. An automatic spraying device for centrifugals embracing an oscillatory spray nozzle, a cut-off valve by which liquid is admitted to and cut off from said nozzle, an automatic timing mechanism acting to cause the closing of the valve after a predetermined interval following its opening combined with an external driving shaft arranged to have automatically discontinuable driving connection with the centrifugal, and means whereby operation of the valve-opening means to admit liquid to the spray nozzle establishes operative connection between said driving shaft and the centrifugal, said connection being automatically interrupted simultaneously with the automatic closing of the valve, substantially as described.

In witness whereof, I have subscribed the above specification.

EUGENE ROBERTS.